Figure 1:
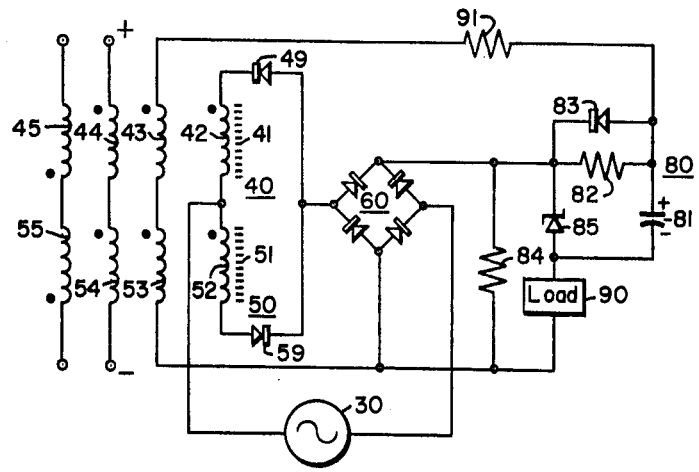

March 28, 1961  J. ROSA  2,977,481

MAGNETIC AMPLIFIER

Filed Feb. 28, 1958

WITNESSES:
Bernard R. Gieguey
Myron E. Click

INVENTOR
John Rosa

BY J. E. Browder
ATTORNEY

United States Patent Office 2,977,481
Patented Mar. 28, 1961

2,977,481

MAGNETIC AMPLIFIER

John Rosa, Pittsburgh, Pa., assignor to Westinghouse Electric Corporation, East Pittsburgh, Pa., a corporation of Pennsylvania Filed Feb. 28, 1958, Ser. No. 718,338

6 Claims. (Cl. 307—88)

This invention relates to magnetic amplifiers in general and in particular to magnetic amplifiers having unidirectional inverse time constants and a fast switching transition in their output.

It is an object of this invention to provide an improved magnetic amplifier.

It is a further object of this invention to provide an improved magnetic amplifier which, if driven by a given magnitude of an input signal, delivers an output after a corresponding time delay, said output having Off to On transition which is as fast as in a normal bistable magnetic amplifier.

Further objects of this invention will become apparent when the following description is taken in conjunction with the accompanying drawings. In said drawings, for illustrative purposes only, there are shown preferred embodiments of this invention. In the drawings, the manner in which the windings have been wound upon their associated cores has been denoted by the polarity dot convention. That is, current flowing into the polarity dot end of a winding will drive the associated core toward positive saturation. Current flowing out of the polarity dot end of a winding will drive the associated core away from positive saturation.

Figure 2:
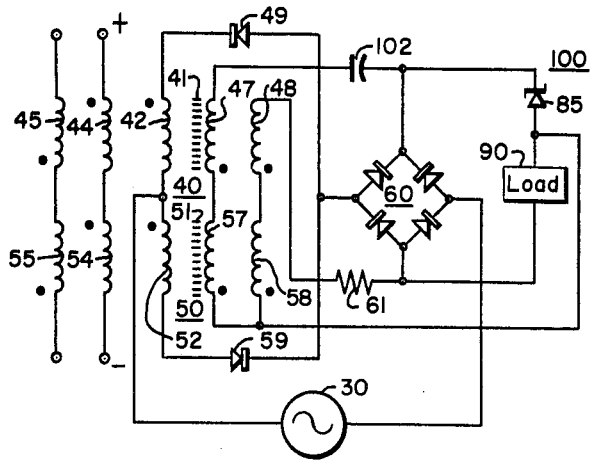

Figure 1 is a schematic diagram of a magnetic amplifier embodying the teachings of this invention; and Figure 2 is a schematic diagram of a second embodiment of the teachings of this invention.

Referring to Figure 1, there is illustrated a magnetic amplifier comprising in general two saturable reactors 40 and 50, an output full wave rectifier 60, a delay means 80, and a load 90.

The saturable reactor 40 comprises a saturable magnetic core 41 having inductively disposed thereon an output winding 42, a feed-back winding 43, a control winding 44, and a bias winding 45. The saturable reactor 50 comprises a saturable magnetic core 51 having inductively disposed thereon an output winding 52, a feed-back winding 53, a control winding 54, and a bias winding 55. The output windings 42 and 52 of the saturable reactors 40 and 50, respectively, are connected through the self-saturating rectifiers 49 and 59 to an alternating current voltage power supply 30 in a doubler arrangement well known to those skilled in the art. The full wave rectifier 60 has its input terminals connected in series with the alternating current voltage source 30.

A semiconductor diode 85 and the load 90 are connected in series across the output terminals of the full wave rectifier 60. The semiconductor diode 85 is polarized to receive the output from the full wave rectifier 60 in the reverse direction to its normal manner of conduction. The diode 85 is to be of the type of diode in which the Zener type of reverse break down can be utilized after a predetermined critical break down voltage is reached. After this critical break down voltage is attained, a constant voltage is dropped across the diode 85. A resistor 82 and a capacitive means 81 are connected in series across the diode 85. A discharge diode 83 is connected across the resistor 82. A discharge resistor 84 is connected across the diode 85 and the load 90.

The feed-back windings 43 and 53 are serially connected with a feed-back resistor 91 with the load 90 and the capacitive means 81. The control windings 44 and 54 are serially connected with terminal means for applying a control voltage. The bias windings 45 and 55 are serially connected with terminal means for applying a bias voltage.

The operation of a magnetic amplifier having its output windings connected in a doubler arrangement is well known to those skilled in the art. The full wave rectifier 60 rectifies the output from the windings 42 and 52 and applies this direct current voltage across the diode 85 and the load 90. The bistable action for the magnetic amplifier illustrated in Figure 1 is obtained by the positive feedback applied to the feed-back windings 43 and 53 from the voltage appearing across the diode 85 and the load 90. Time delay for the magnetic amplifier is obtained from the break down characteristics of the diode 85 and the resistor 82-capacitor 81 circuit inserted in the positive feed-back circuit. A direct current voltage is applied to the bias windings 45 and 55 to set the flux level in the saturable magnetic cores 41 and 51, respectively, to a desired level. Therefore, a control voltage, with polarity as shown, must be applied to the control windings 44 and 54 to attain a desired output.

Assume that a step input signal of the indicated polarity is applied to the control windings 44 and 54. A voltage will appear from the output windings 42 and 52 across the output terminals of the rectifier 60. Assume that the input to the control windings 44 and 54 is small enough so that the output voltage appearing at the output terminals of the full wave rectifier 60 does not exceed the critical break down value of the diode 85. Hence, the whole output voltage will be dropped across the diode 85, and the potential on each side of the load 90 will be at the same level. This output voltage will charge the capacitive means 81 through the resistance 82. Since the capacitive means 81 is charging, the positive feedback to the windings 43 and 53 will be lagging behind the voltage across the Zener diode, and the output voltage across the full wave rectifier 60 will build up slowly. The delaying effect of feeding back the output voltage to the feed-back windings 43 and 53 is inversely proportional to the magnitude of the input signal to be applied to the serially connected control windings 44 and 54. Once the output voltage reaches the critical break down voltage of the semiconductor diode 85, the excess voltage will fall across the load 90. This voltage across the load 90 is fed back to the feed-back windings 43 and 53 without delay, since the resistor 82-capacitor 81 circuit delays only the voltage falling across the semiconductor diode 85. Consequently, bistable action or switching action from Off to On in the magnetic amplifier illustrated in Figure 1 occurs immediately upon occurrence of breakdown of the Zener diode.

If the input signal applied to the serially connected control windings 44 and 54 decreases, the capacitor 81 can discharge through the diode rectifier 83 and the resistor 84, which is a low value compared to the resistor 82, practically without delay making the transition from On to Off substantially instantaneous.

The resistor 82-capacitor 81 network inserted in the positive feed-back circuit has a double effect. The resistor 82-capacitor 81 network operates on a low energy level making possible the use of a low voltage, high capacity capacitor, and a low wattage resistor, both of small size. The time constant $T=RC$ inserted in the positive feed-back circuit results in an overall time constant for the magnetic amplifier $$T_0 = \frac{T}{(1-GH)}$$

where G and H are the forward and feed-back gains, respectively. If $GH=1$, the overall time constant $T_0$ is much larger than a time constant T of the RC network; therefore, a smaller capacitor is needed to obtain the prescribed time delay. Added to the effect of the RC circuit, the switching action of the magnetic amplifier is effected as hereinbefore explained by the diode 85 having a Zener type break down effect being connected in series with the output voltage.

Referring to Figure 2, there is illustrated another embodiment of the teachings of this invention, in which like components of Figures 1 and 2 have been given the same reference characters. The main distinction between the apparatus illustrated in Figures 1 and 2 is that a different embodiment of the feedback circuit is employed. The diode 85 and the load 90 are connected as hereinbefore described in series across the output of the full wave rectifier 60. However, feed-back windings 48 and 58 inductively disposed upon the saturable magnetic cores 41 and 51, respectively, are serially connected with a feed-back resistor 61 across the load 90. A pair of feed-back windings 47 and 57 are inductively disposed upon the saturable magnetic cores 41 and 51, respectively, and are serially connected with a capacitor 102 across the semiconductor diode 85.

If a control signal as hereinbefore described with polarity as shown in Figure 2 is applied to the serially connected control windings 44 and 54, an output voltage will again appear across the full wave rectifier 60. Assuming that the output voltage is less than the critical break down voltage of the diode 85, the capacitor 102 will deliver a negative feedback to the feedback windings 47 and 57 proportional to the rate of change of voltage across the capacitor with respect to time, thereby delaying the build up of the output voltage across the full wave rectifier 60. This delaying action continues until the output voltage across the rectifier 60 exceeds the critical reverse break down voltage of the semiconductor diode 85. When the critical break down voltage of the diode 85 is exceeded, current will begin to flow through the load 90.

At this point the voltage that is dropped across the diode 85 will remain constant. Therefore, there will be no feedback to the feed-back windings 47 and 57. The negative feed-back effect thus stopped or cancelled, the output voltage across the rectifier 60 develops without delay. The current now flowing through the load 90 builds up a voltage across the load 90 which is fed directly back to the feed-back windings 48 and 58 through the resistor 61 resulting in a positive feedback which, with the proper selection of the value of the resistor 61, is used to obtain bistable operation of the magnetic amplifier. The output voltage upon reaching the critical break down value of the diode 85 causes a switching action to occur in the magnetic amplifier illustrated in Figure 2 giving a sharp transition from Off to On. Again the delay is inversely proportional to the magnitude of the input applied to the serially connected control windings 44 and 54.

A magnetic amplifier has been described which has a unidirectional inverse time constant and a fast switching action in the transition from Off to On and vice versa. The magnetic amplifier as disclosed in this application is valuable for applications such as controlling a voltage regulator tap-changer-transformer. In this kind of application the input signal for the control windings may be provided by a voltage error sensing transducer. If the error surpasses the prescribed limit, the magnetic amplifier turns On with delay and operates the tap-changer mechanism. The delay time is inversely proportional to the error signal. If the error is corrected, the magnetic amplifier turns Off without delay. Both transitions are fast, i.e. the switching action is substantially instantaneous compared to the preceding time delay.

In conclusion, it is pointed out that while the illustrated amplifiers constitute a practical embodiment of my invention, I do not limit myself to the exact details shown, since modification of the same may be varied without departing from the spirit and scope of this invention.

I claim as my invention:

1. In a magnetic amplifier, in combination; a plurality of saturable reactors; each said saturable reactor comprising a saturable magnetic core having inductively disposed thereon an output winding means, feedback winding means and control winding means; said plurality of saturable reactors having their output winding means connected to furnish a direct current output to a load circuit dependent upon an input signal to said control windings, said load circuit comprising semiconductor diode means serially connected with a load and polarized to oppose the flow of current from said direct current output, said semiconductor diode means having a breakdown characteristic in response to a predetermined magnitude of said direct current output, feedback circuit means feeding a signal to said feedback winding means proportional to that part of said output across said semiconductor diode means but delayed with respect thereto when said output is below said predetermined magnitude, said feedback circuit means feeding a signal to said feedback winding means proportional to the current flow in said load when said output is above said predetermined magnitude.

2. In a magnetic amplifier, in combination; a plurality of saturable reactors; each said saturable reactor comprising a saturable magnetic core having inductively disposed thereon an output winding means, positive feedback winding means and control winding means; said plurality of saturable reactors having their output winding means connected to furnish a direct current output to a load circuit dependent upon an input signal to said control windings, said load circuit comprising semiconductor means serially connected with a load for opposing current flow below a predetermined magnitude of said output, feedback circuit means feeding a signal to said feedback winding means proportional to that part of said output across said semiconductor means but delayed with respect thereto when said output is below said predetermined magnitude, said feedback circuit means feeding a signal to said feedback winding means proportional to the current flow in said load when said output is above said predetermined magnitude.

3. In a magnetic amplifier, in combination; a plurality of saturable reactors; each said saturable reactor comprising a saturable magnetic core having inductively disposed thereon an output winding means, positive feedback winding means and control winding means; said plurality of saturable reactors having their output winding means connected to furnish a direct current ouput to a load circuit dependent upon an input signal to said control windings, said load circuit comprising semiconductor means serially connected with a load for opposing current flow below a predetermined magnitude of said output, feedback circuit means feeding a signal to said feedback winding means proportional to that part of said output across said semiconductor means but delayed with respect thereto when said output is below said predetermined magnitude, said feedback circuit means feeding a signal to said feedback winding means proportional to the current flow in said load when said output is above said predetermined magnitude, said feedback circuit means comprising capacitive means coupling the voltage across said semiconductor means to said feedback winding means.

4. In a magnetic amplifier, in combination; a plurality of saturable reactors; each said saturable reactor comprising a saturable magnetic core having inductively disposed thereon an output winding means, positive feedback winding means and control winding means; said plurality of saturable reactors having their output winding means connected to furnish a direct current output to a load circuit dependent upon an input signal to said control windings, means for applying a step-input signal to said control winding means of said plurality of saturable reactors, said load circuit comprising semiconductor means serially connected with a load for opposing current flow below a predetermined magnitude of said output, feedback circuit means feeding a signal to said feedback winding means proportional to that part of said output across said semiconductor means but delayed with respect thereto when said output is below said predetermined magnitude, said feedback circuit means feeding a signal to said feedback winding means proportional to the current flow in said load when said output is above said predetermined magnitude, said feedback circuit means comprising capacitive means coupling the voltage across said semiconductor means to said feedback winding means.

5. In a magnetic amplifier, in combination; a plurality of saturable reactors; each said saturable reactor comprising a saturable magnetic core having inductively disposed thereon an output winding means, positive feedback winding means and control winding means; said plurality of saturable reactors having their output winding means connected to furnish a direct current output to a load circuit dependent upon an input signal to said control windings, means for applying a step-input signal to said control winding means of said plurality of saturable reactors, said load circuit comprising semiconductor serially connected with a load for opposing current flow below a predetermined magnitude of said output, feedback circuit means feeding a signal to said feedback winding means proportional to that part of said output across said semiconductor means but delayed with respect thereto when said output is below said predetermined magnitude, said feedback circuit means feeding a signal to said feedback winding means proportional to the current flow in said load when said output is above said predetermined magnitude, said feedback circuit means comprising capacitive means coupling the voltage across said semiconductor means to said feedback winding means, and means for substantially discharging said capacitive means instantaneously upon said input signal decreasing such that the voltage across the semiconductor means becomes less than said predetermined magnitude.

6. In a magnetic amplifier, in combination; a plurality of saturable reactors; each said saturable reactor comprising a saturable magnetic core having inductively disposed thereon an output winding means, feedback winding means and control winding means, said plurality of saturable reactors having their output winding means connected to furnish a direct current output to a load circuit dependent upon an input signal to said control windings, said load circuit comprising semiconductor means serially connected with a load for opposing current flow below a predetermined magnitude of said output, feedback circuit means connected to said feedback winding means for providing a first feedback signal when the output is less than said predetermined magnitude and for providing a second feedback signal when the output exceeds said predetermined magnitude.

References Cited in the file of this patent

UNITED STATES PATENTS

| | | |
|---|---|---|
| 2,561,329 | Ahlen | July 24, 1951 |
| 2,751,545 | Chase | June 19, 1956 |
| 2,790,127 | Hamilton | Apr. 23, 1957 |
| 2,810,877 | Silver | Oct. 22, 1957 |
| 2,817,807 | Weir | Dec. 24, 1957 |